No. 659,394. Patented Oct. 9, 1900.
G. C. HAMILTON.
FAUCET ATTACHMENT.
(Application filed Oct. 2, 1899.)
(No Model.)

Witnesses:
R. J. Jacker,
M. R. Rochford

Inventor:
George C. Hamilton
By Rowland S. Ludington
Atty.

THE NORRIS PETERS CO., PHOTO-LITHO., WASHINGTON, D. C.

UNITED STATES PATENT OFFICE.

GEORGE C. HAMILTON, OF CHICAGO, ILLINOIS.

FAUCET ATTACHMENT.

SPECIFICATION forming part of Letters Patent No. 659,394, dated October 9, 1900.

Application filed October 2, 1899. Serial No. 732,360. (No model.)

*To all whom it may concern:*

Be it known that I, GEORGE C. HAMILTON, a citizen of the United States, residing at Chicago, in the county of Cook and State of Illinois, have invented a certain new and useful Improvement in Faucet Attachments, of which the following is a full, clear, concise, and exact description, reference being had to the accompanying drawings, forming a part of this specification.

My invention relates to an improvement in faucet attachments, my object being to provide a simple, cheap, and easily attached and arranged attachment for a faucet whereby a pail, kettle, or similar object may be hung on the faucet while being filled. In the preferred construction I provide a hook having a shank adapted to lie on the faucet-spout and provided at the ends with means for engaging the faucet whereby the attachment is held in place.

I have illustrated my invention in the accompanying drawings, in which—

Figure 1:
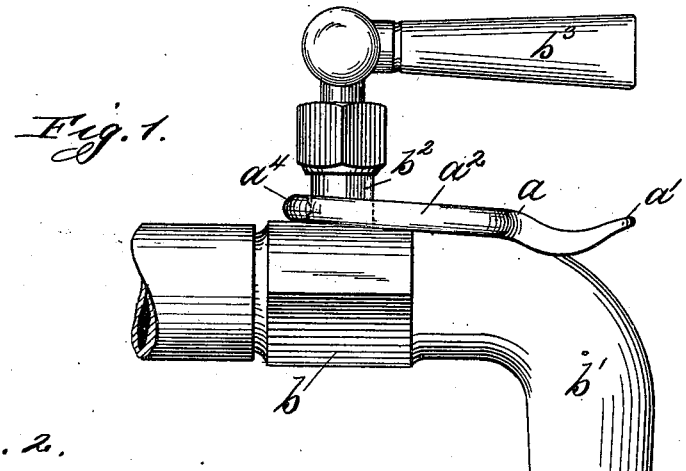
Figure 2:
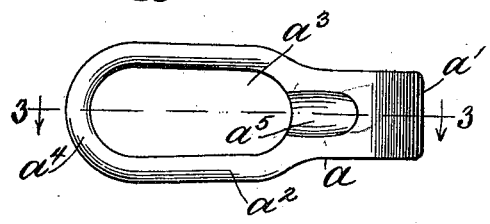
Figure 3:
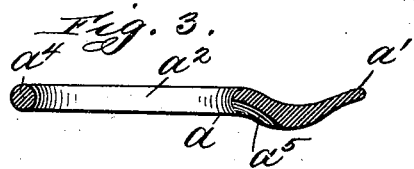
Figure 4:
Figure 5:
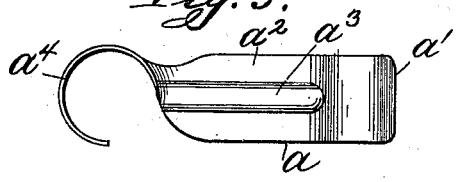
Figure 6:
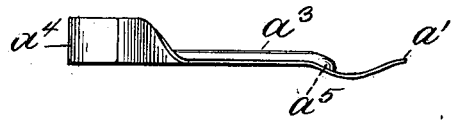

Figure 1 is a view of a faucet provided with the attachment. Fig. 2 is a bottom view. Fig. 3 is a sectional view on line 3 3, Fig. 2. Fig. 4 is a view of a blank for a modification. Fig. 5 is a plan view of such modification, and Fig. 6 is a side view thereof.

Like letters refer to like parts in the several figures.

At one end of the attachment $a$ is the hook $a'$ for holding a kettle bail or handle. Attached to the hook $a'$ is the rearwardly-extending shank $a^2$, having in the center the longitudinal hollow $a^3$, adapted to permit the shank to fit down over the convex upper surface of the faucet-spout $b'$. At the rear end of the longitudinal hollow $a^3$ and of the shank $a^2$ is the partially-annular and rearwardly-extending portion $a^4$, adapted to partially surround the valve-stem bearing $b^2$ of the faucet $b$. In the forward part of the shank $a^2$, on the under side near the hook $a'$, is the concave or hollowed out place $a^5$, adapted to fit over the curved convex upper side of the faucet-spout $b'$ to permit the attachment to have a firmer seat. In Figs. 1, 2, and 3 the hollow portion $a^3$ is cut out in part to form an opening in connection with the opening within the annular portion $a^4$.

In placing the attachment in position the annular portion $a^4$ is placed over and around the valve-stem bearing $b'$, so as to engage the bearing on the rear side below the handle $b^3$. The bail of the kettle can then be placed on the hook $a'$ and the handle of the faucet turned to permit the liquid to fill the kettle without the exertion and bother of holding the kettle up with the hands during the filling. This is particularly desirable when filling a hot kettle, as there is no danger of being burned by the steam during the operation.

When not in use, the attachment may be left on the faucet or may be easily and quickly removed and hung up. It may also be used as a handle for lifting kettles, stove-lids, or anything of a similar nature that may be too hot to lift with the unprotected hands.

Having fully described my invention, what I claim as new, and desire to secure by Letters Patent, is—

1. In a faucet attachment, the combination with the upper surface of a faucet-spout, of a detachable hook adapted to fit thereon and means for attaching said hook in position on said faucet substantially as described.

2. In a faucet attachment the combination with a detachable hook, of a concave place on the under side thereof adapted to fit on the upper curved surface of a faucet-spout and means for attaching said hook in position on the upper side of the faucet substantially as described.

3. In a faucet attachment the combination with a hook and a shank therefor, of a longitudinal hollow in said shank and an annular portion at one end of said hollow substantially as described.

4. In a faucet attachment the combination with a detachable hook adapted to lie on the upper side of a faucet of a rearwardly-extending portion adapted to engage the faucet and hold the hook in position.

5. In a faucet attachment, the combination with the valve-stem bearing of a faucet, of a hook, a shank on said hook and an extending portion on said shank adapted to engage the valve-stem bearing to hold the hook in position.

6. In a faucet attachment, the combination with a shank adapted to lie on the upper part of a faucet-spout, of a hook at one end of said shank, and means at the other end of said shank for holding the shank in place on said spout substantially as described.

7. In a faucet attachment the combination with a hook having a shank therefor, of a longitudinal hollow in said shank, a partially-annular portion on the rear end of said shank and a concave place on the under side of the forward end of said shank substantially as described.

8. In a faucet attachment the combination with a hook of two rearwardly-extending shanks connected therewith and an annular portion connecting the rear ends of said shanks, substantially as described.

In witness whereof I have hereunto subscribed my name in the presence of two witnesses.

GEORGE C. HAMILTON.

Witnesses:
R. S. LUDINGTON,
W. E. MONSER.